US012294250B2

(12) United States Patent
Siracki

(10) Patent No.: US 12,294,250 B2
(45) Date of Patent: May 6, 2025

(54) MOTOR ENCODER ANTI-ROTATION DEVICE

(71) Applicant: Nidec Motor Corporation, St. Louis, MO (US)

(72) Inventor: Glenn Siracki, Burton, OH (US)

(73) Assignee: Nidec Motor Corporation, St. Louis, MO (US)

( * ) Notice: Subject to any disclaimer, the term of this patent is extended or adjusted under 35 U.S.C. 154(b) by 366 days.

(21) Appl. No.: 18/150,864

(22) Filed: Jan. 6, 2023

(65) Prior Publication Data

US 2023/0223822 A1    Jul. 13, 2023

Related U.S. Application Data

(60) Provisional application No. 63/297,260, filed on Jan. 7, 2022.

(51) Int. Cl.
  *H02K 11/21*    (2016.01)
(52) U.S. Cl.
  CPC .................................. *H02K 11/21* (2016.01)
(58) Field of Classification Search
  CPC .... G01D 5/24442; H02K 11/21; H02K 41/00; H02K 27/00; H02K 7/00; H02K 7/003; H02K 7/006; H02K 7/20; H02K 11/33
  See application file for complete search history.

(56) References Cited

U.S. PATENT DOCUMENTS

| 5,859,425 A  * | 1/1999 | Mleinek | G01D 11/245 |
| | | | 250/239 |
| 6,601,307 B2 * | 8/2003 | Meyer | G01D 5/34738 |
| | | | 310/91 |
| 2007/0295557 A1* | 12/2007 | Aldridge | F16H 57/0427 |
| | | | 184/13.1 |
| 2011/0169358 A1* | 7/2011 | Furukawa | H02K 29/08 |
| | | | 310/89 |

FOREIGN PATENT DOCUMENTS

| CN | 208939772 | 6/2019 |
| JP | 2018-042332 | 3/2018 |
| JP | 2021-136788 | 9/2021 |
| WO | 2016052342 | 4/2016 |

OTHER PUBLICATIONS

International Search Report and Written Opinion for PCT Application No. PCT/US2023/060203 (Dated May 3, 2023).

* cited by examiner

*Primary Examiner* — Naishadh N Desai
(74) *Attorney, Agent, or Firm* — Hovey Williams LLP

(57) ABSTRACT

An encoder assembly is provided for use in an electromagnetic apparatus including an apparatus body and a rotor. The rotor includes a shaft rotatable relative to the apparatus body. The encoder assembly comprises an encoder and a mounting system for mounting the encoder to the apparatus body. The encoder includes an encoder body and an encoder shaft. The encoder shaft is configured to be coupled with the rotor shaft and rotatable relative to the encoder body about an axis. The (Continued)

mounting system includes a mounting frame fixed relative to the apparatus body and a tether interconnecting the encoder body and the mounting frame. The mounting system permits limited radial and axial movement of the encoder body relative to the mounting frame.

17 Claims, 10 Drawing Sheets

MOTOR ENCODER ANTI-ROTATION DEVICE

CROSS-REFERENCE TO RELATED APPLICATION

1. Priority Application

The present application claims the benefit of and priority from U.S. Provisional Patent Application No. 63/297,260, filed Jan. 7, 2022, the entire disclosure of which is hereby incorporated by reference herein.

BACKGROUND OF THE INVENTION

1. Field of the Invention

The present invention relates generally to mounting of encoders to prevent rotation of the bodies thereof.

2. Discussion of the Prior Art

Conventional devices including a rotating component may include an encoder to detect rotation angle of the rotating component and, in turn, provide a signal that may be used to determine position, speed, direction, count, and so on of the rotating component. For instance, in a conventional electric motor, an encoder may be provided to detect and send signals pertaining to the speed and position of a rotatable motor shaft. Such signals may thereafter be processed and analyzed (for instance, by a controller) in view of desired motor performance. Adjustments to control signals may then be made, if necessary.

A variety of techniques are known for mounting encoders to motors or other electromagnetic apparatuses. Such techniques aim to couple the encoder to the rotating shaft while preventing rotation of the fixed portions of the encoder itself, such as the encoder body. Prior art techniques vary in accordance with encoder type, such as hollow shaft or solid shaft, but include external flanges and flexible couplings, concentric clamps and flexible tethers, direct mounts, C-face or ring mounts, and more.

SUMMARY

According to one aspect of the present invention, an encoder assembly is provided for use in an electromagnetic apparatus including an apparatus body and a rotor. The rotor includes a shaft rotatable relative to the apparatus body. The encoder assembly comprises an encoder and a mounting system for mounting the encoder to the apparatus body. The encoder includes an encoder body and an encoder shaft. The encoder shaft is configured to be coupled with the rotor shaft and rotatable relative to the encoder body about an axis. The mounting system includes a mounting frame fixed relative to the apparatus body and a tether interconnecting the encoder body and the mounting frame. The mounting system permits limited radial and axial movement of the encoder body relative to the mounting frame.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

Some prior art motors or other electromagnetic apparatuses are configured to provide a bearing tube or similar structure into which an encoder is mounted. For instance, in one prior art technique suited for such a configuration, a tether comprising an expanding ring is provided for fitment into a motor-provided tube and consequent support of an encoder therein. The design includes two wedges and a screw to expand the ring to engage the tube walls. The design of the ring is such that only a limited expansion range may be facilitated, such that the nominal diameter of the ring must be very close to the inner diameter of the associated motor tube. This leads to the potential for interference or dragging of the ring along the tube walls during installation or removal of the ring and encoder, which may stress the encoder and also damage the tether itself. Furthermore, because the ring has only relatively small expansion capability, applicability is limited to only a narrow range of tube sizes. The small tolerance between diameters is also such that any debris or corrosion inside the tube, as would commonly be present in field applications/installations, can further inhibit installation or removal.

The tether may also restrict both axial and radial movement, stressing the encoder bearings. Furthermore, because the design is semi-rigid in the radial direction, motor shaft runout may include cycling bearing loads that may affect signal quality.

Finally, such a design can be complex both from a manufacturing perspective and from an installation and removal perspective, including many small parts, requiring an intricate cast aluminum ring, utilizing many custom fabrications, and necessitating specialized installation tools.

An alternative prior art design utilizes an inexpensively produced, readily reusable flexible tether that typically does not cause damage to the encoder during removal, thus being advantageous in some regards over the first prior art design described above. However, this alternative conventional prior art tether can be nonetheless deficient in many regards. For instance, the tether may restrict axial movement and severely restricts radial movements, stressing the encoder bearings. The tether may not automatically center the encoder and demands extremely low motor shaft runout. Furthermore, the tether may not fit existing motors with tube systems and is prone to installation in such a manner that the encoder bearings are stressed both in an immediate and ongoing manner.

BRIEF DESCRIPTION OF THE DRAWING FIGURES

Preferred embodiments of the present invention are described in detail below with reference to the attached drawing figures, wherein.

Figure 1:
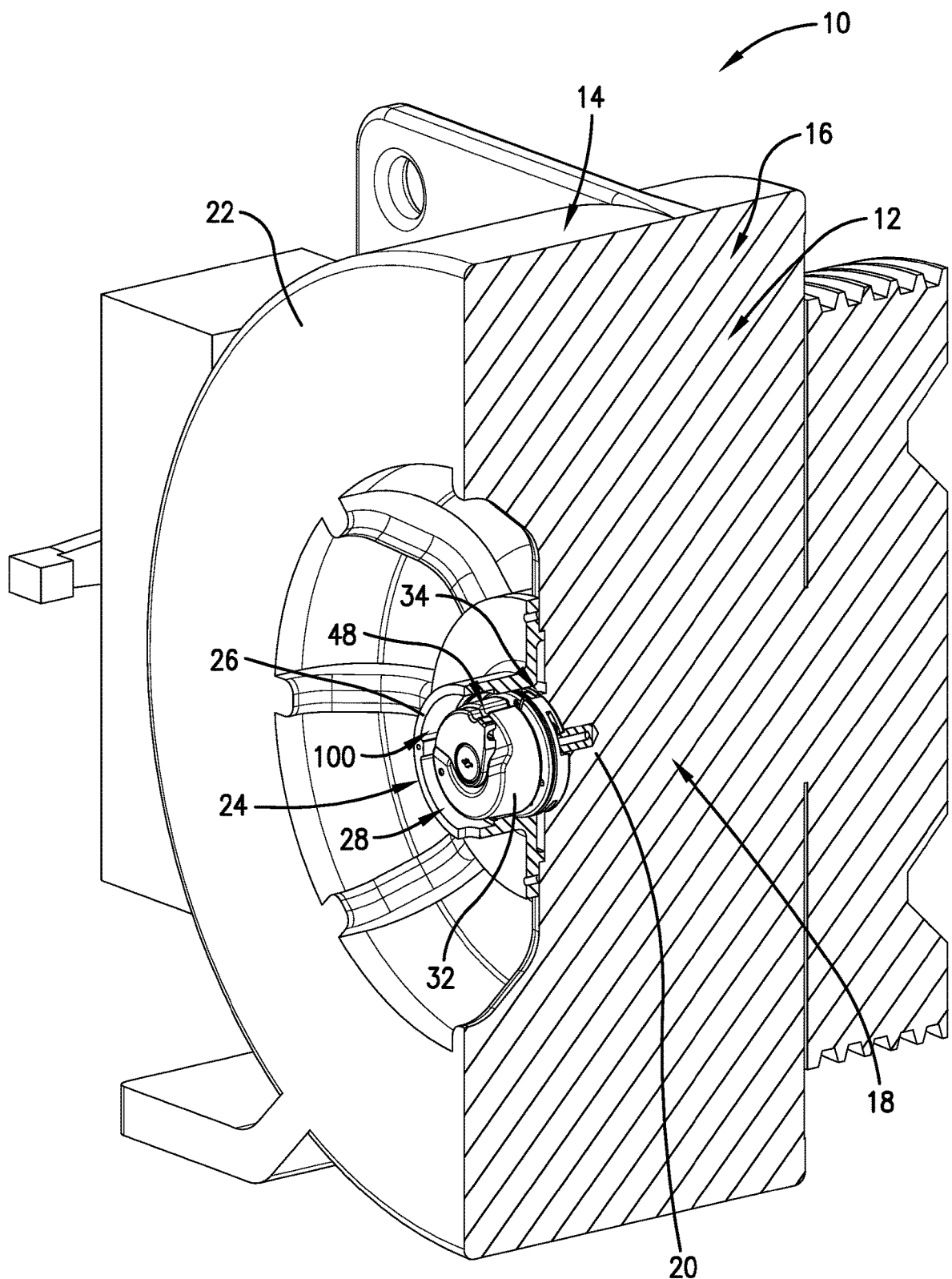
FIG. 1 is partially schematic, cross-sectional front perspective view of an encoder assembly and an electromagnetic apparatus in keeping with a preferred embodiment of the present invention.

The drawing figures do not limit the present invention to the specific embodiments disclosed and described herein. While the drawings do not necessarily provide exact dimensions or tolerances for the illustrated structures or components, the drawings are to scale with respect to the relationships between the components of the structures illustrated in the drawings.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the embodiments.

Furthermore, unless specified or made clear, the directional references made herein with regard to the present invention and/or associated components (e.g., top, bottom, upper, lower, inner, outer, etc.) are used solely for the sake of convenience and should be understood only in relation to each other. For instance, a component might in practice be oriented such that faces referred to as "top" and "bottom" are sideways, angled, inverted, etc. relative to the chosen frame of reference.

Overview

The present invention pertains to mounting of an encoder to an electromagnetic apparatus (for instance, a motor, generator, or so on) in such a manner as to prevent rotation of fixed components of the encoder relative to fixed components of the electromagnetic apparatus. Mounting of the encoder is also such that rotating components of the encoder, such as the encoder shaft, are rotatable relative to the fixed components of the encoder and apparatus but fixed relative to the rotor shaft of the apparatus, so as to rotate therewith. Alternatively stated, the rotor shaft and the encoder shaft are rotatably isolated from the fixed components of the encoder and the electromagnetic apparatus.

As will be discussed in greater detail below, mounting is accomplished through use of an anti-rotation anchoring or mounting mechanism including a radially floating tether to allow rotor shaft runout compliance and to facilitate axisymmetric encoder bearing loading. The inventive design also negates the need to perfectly center the encoder in the mounting tube or other mounting structure provided by the associated electromagnetic apparatus, increasing ease of installation. The tether is a flexible member that can additionally accommodate a measure of axial displacement of the rotor shaft.

As will also be discussed in greater detail below, the tether preferably engages an expanding frame that lodges against inner tube or mounting structure walls. The frame itself can preferably expand, with such expansion being driven by a mechanical wedge or set screw, an extendable or rotatable member such as a ball or lever, or another mechanism suitable for the particular frame in use. The expanded frame (or an extended member thereof, and so on) preferably frictionally grips the tube wall to prevent the encoder body from rotating when coupled to the rotor shaft.

Electromagnetic Apparatus and Encoder Assembly—Structure and Function

A preferred embodiment of the present invention is illustrated in FIGS. 1-11. More particularly, with reference to FIGS. 1-3, an electromagnetic apparatus 10 (shown primarily schematically) is shown. The electromagnetic apparatus 10 in the illustrated embodiment is a motor assembly 10 that includes a motor 12 (shown schematically) and a body 14 (shown largely schematically). The motor 12 includes a stator 16 and rotor 18 (each also being shown schematically). The rotor 18 is rotatable about an axis and includes an apparatus or rotor shaft 20 that is rotatable about the axis and relative to the apparatus body 14.

The body 14 includes a housing 22 (shown largely schematically). The housing 22 includes an encoder-receiving element 24 including a tube 26. The tube 26 defines an opening 28. The illustrated encoder-receiving element 24 is in the form of a bearing cap 24.

Encoder Assembly

An encoder assembly 30 is provided for use with the electromagnetic apparatus 10. The encoder assembly 30 includes an encoder 32 and a mounting system 34 for mounting the encoder 32 to the apparatus body 14 via the bearing cap 24.

Figure 4:
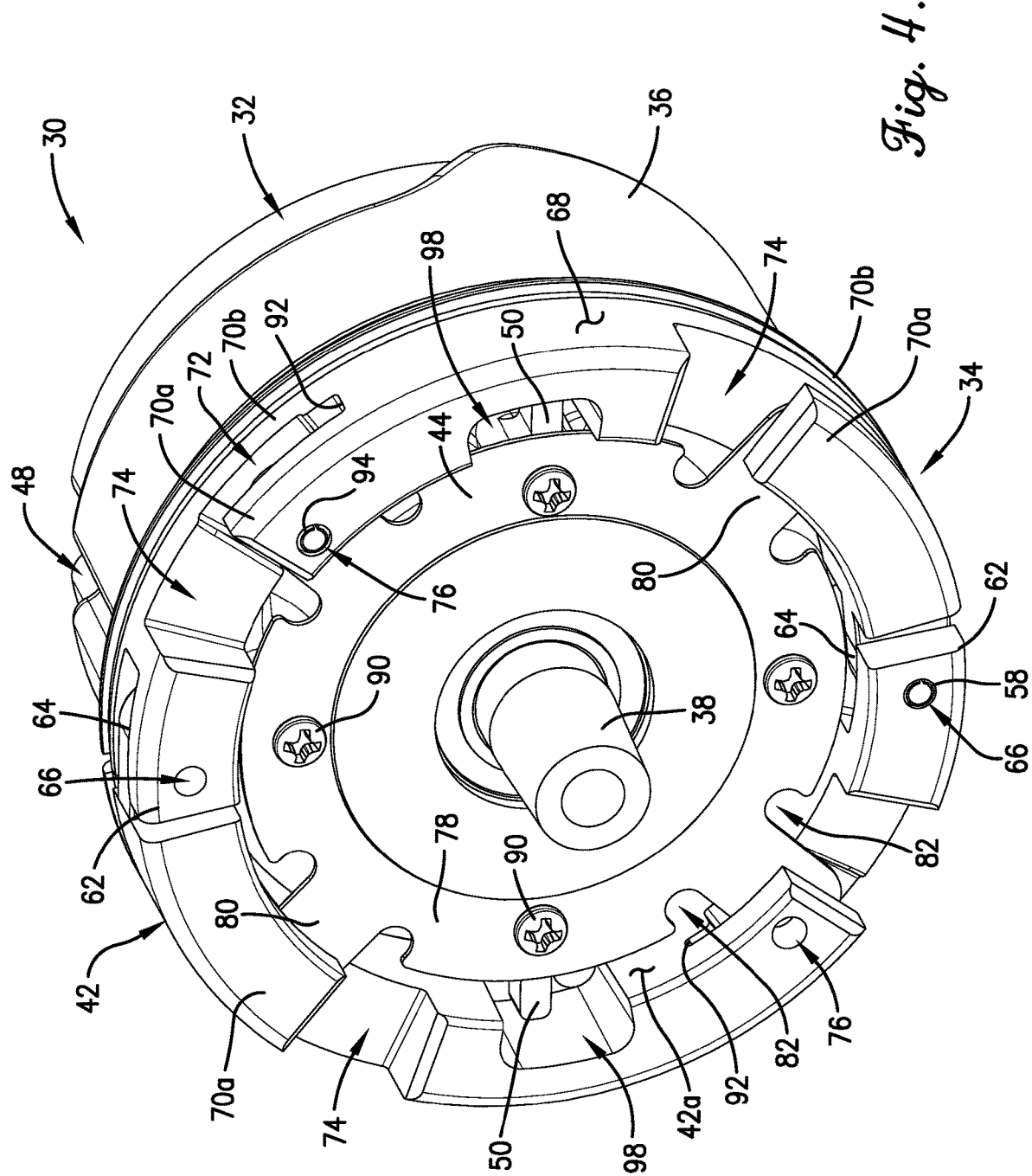
FIG. 4 is an enlarged rear perspective view of the encoder assembly of FIGS. 1-3.
Figure 5:
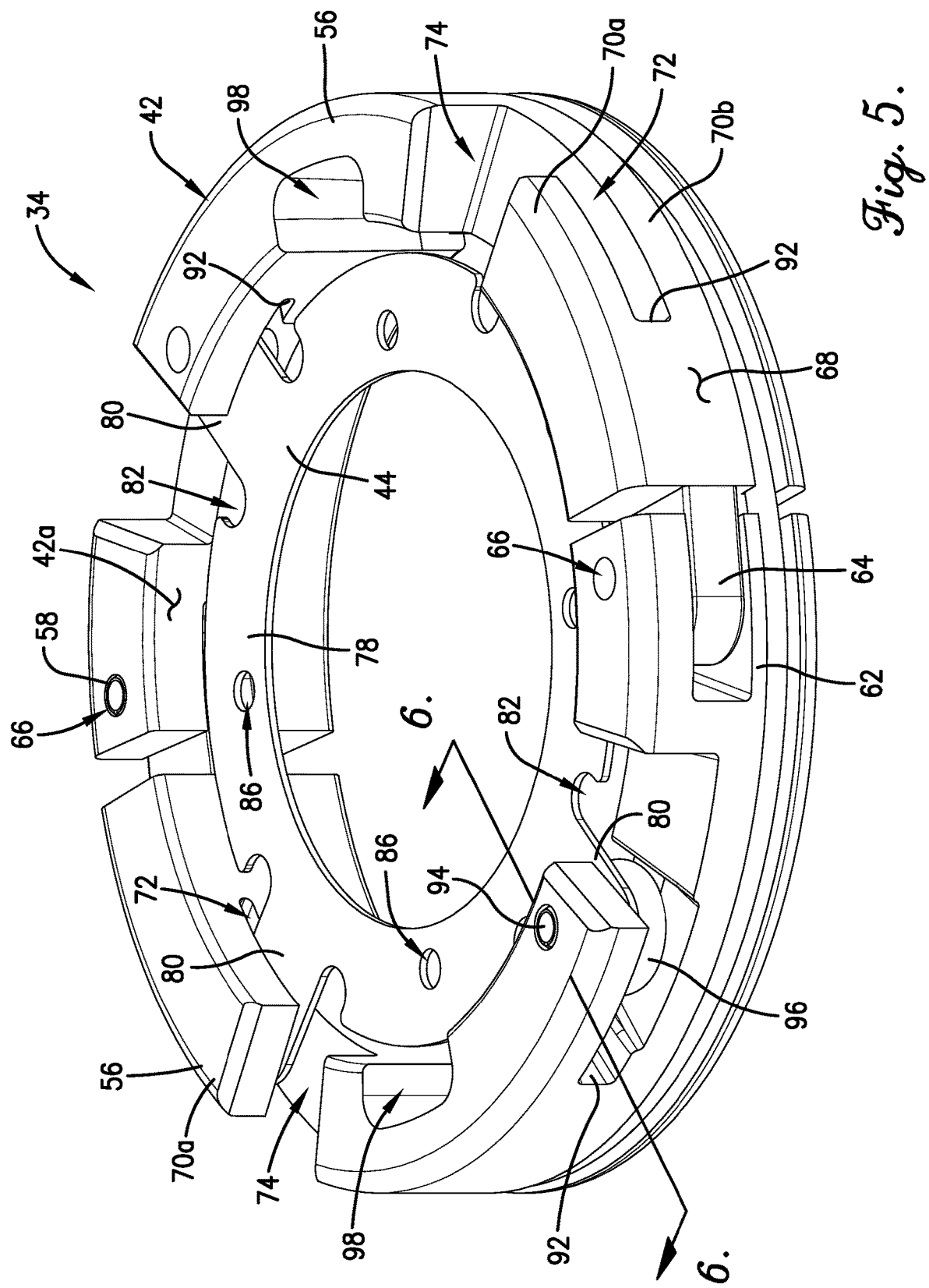
FIG. 5 is a side perspective view of the mounting assembly of the encoder assembly of FIGS. 1-4.

Referring to FIG. 4, the encoder 32 includes an encoder body 36 and an encoder shaft 38 coupled with the rotor shaft 20 to rotate therewith. Most preferably, the rotor shaft 20 and the encoder shaft 38 are axially aligned and cooperatively rotatable about the aforementioned axis and relative to the apparatus body 14 and the encoder body 36. An axially extending channel 48 is defined in the encoder body 36. Furthermore, a pair of diametrically opposed projections 50 preferably extend radially outward from the encoder body 36.

Encoder bearings 40 are preferably disposed between the encoder shaft 38 and the encoder body 36 to rotatably support the encoder shaft 38 therein.

The mounting system 34 preferably broadly includes a mounting frame 42 fixed relative to the apparatus body 14 and a tether 44 interconnecting the encoder body 36 and the mounting frame 42. As will be apparent from the below description, the mounting system 34 permits limited radial and axial movement of the encoder body 36 relative to the mounting frame 42 while restricting undue rotation of fixed components. The mounting system 34 also automatically centers the encoder 32 and the rotor shaft 20 relative to one another.

Returning to FIGS. 1, 2 and 3, the encoder 32 is at least in part received within the opening 28 and secured relative to the bearing cap 24 by the mounting system 34. The encoder 32 is also secured relative to the rotor shaft 20.

More particularly, the encoder shaft 38 is preferably received within a corresponding receiver 46 defined in the rotor shaft 20 so as to rotate therewith. In contrast, the encoder body 36 is preferably stationary (that is, non-rotating) via fixation within the bearing cap 24. The mounting system 34 facilitates such a connection, preventing the encoder body 36 from rotating while the encoder shaft 38 is coupled to and thus rotating along with the spinning rotor shaft 20.

An axially extending channel 48 is defined in the encoder body 36. The function of the channel 48 will be discussed in greater detail below.

Furthermore, a pair of diametrically opposed projections 50 preferably extend radially outwardly from the encoder body 36. The projections 50 will likewise be discussed in greater detail below.

Bearing Cap

Figure 2:
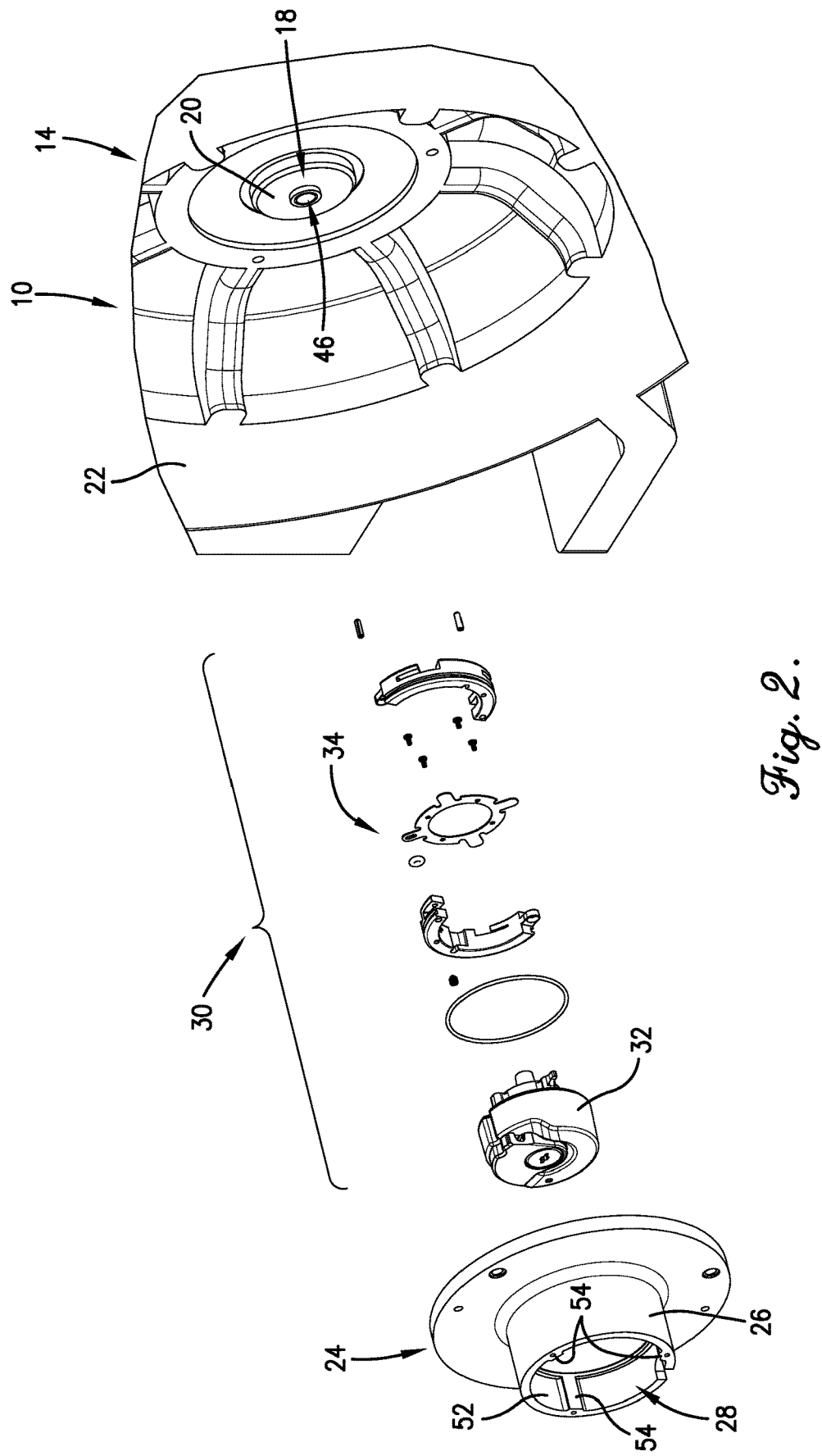
FIG. 2 is an exploded front perspective view of the encoder assembly and a portion of the electromagnetic apparatus of FIG. 1.
Figure 3:
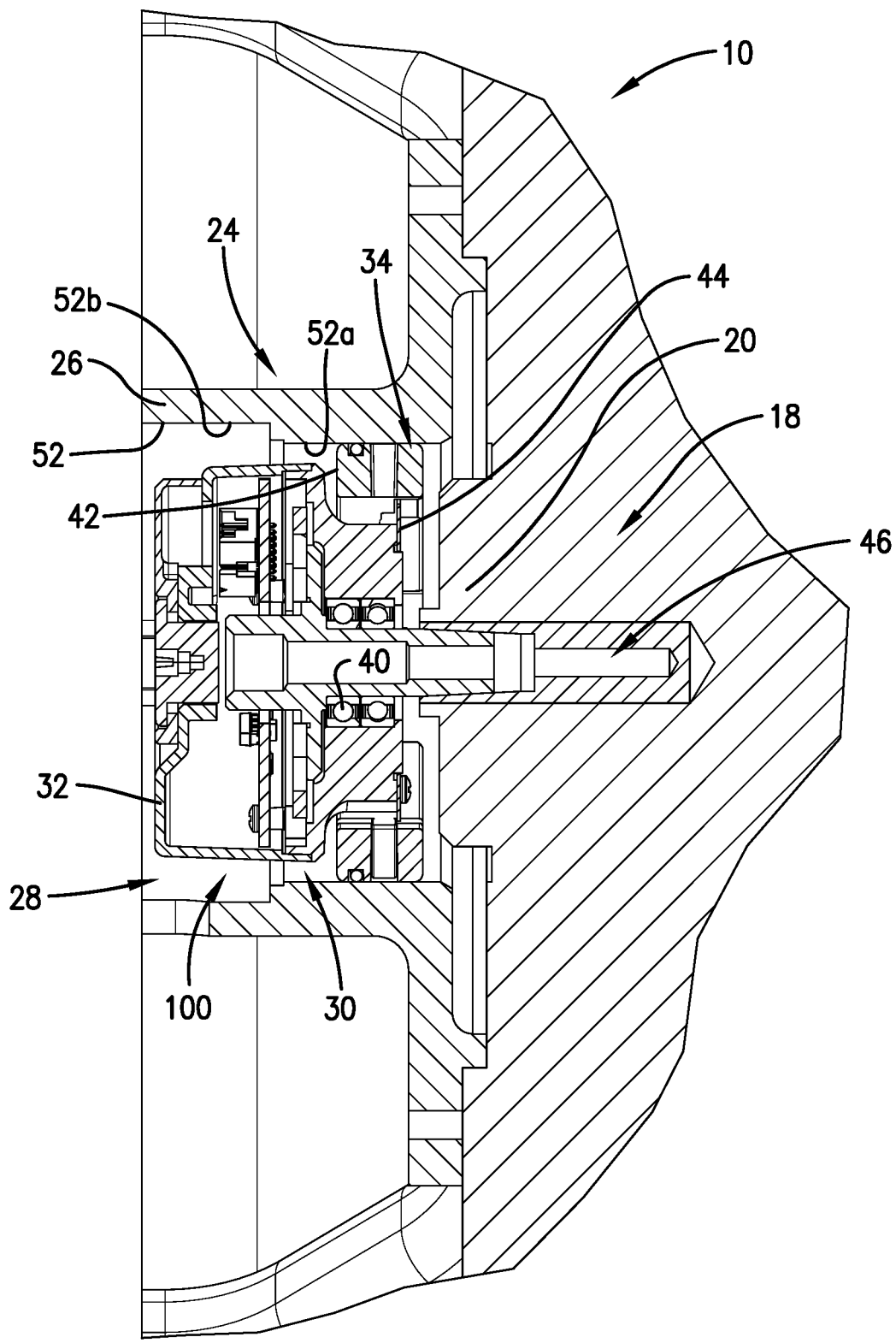
FIG. 3 is a cross-sectional side view of the encoder assembly and a portion of the electromagnetic apparatus of FIGS. 1 and 2.

Referring to FIGS. 2 and 3 and turning to the bearing cap 24, the tube 26 thereof preferably presents an inner wall 52 defining the opening 28. The inner wall 52 includes an inner portion 52*a* nearer the rotor 18 and an outer portion 52*b* spaced axially therefrom. The inner portion 52*a* has a smaller inner diameter than that of the outer portion 52*b*.

The tube 26 also includes a plurality of arcuately spaced apart, radially inwardly projecting, axially extending ridges or bosses 54.

Mounting Frame

As noted previously, the mounting system 34 preferably includes the tether 44 and the mounting frame 42. The mounting frame 42 is preferably an expanding frame or expansion ring 42 shiftable between installed and uninstalled configurations. In the illustrated embodiment, the installed configuration is an expanded configuration, in which the ring 42 presses outwardly against the inner wall 52 of the tube 26. In contrast, the uninstalled configuration is a contracted configuration in which radial space is available between the ring 42 and the inner wall 52. Alternative embodiments, including embodiments in which the installed and uninstalled configurations are instead respectively contracted and expanded, fall within the scope of some aspects of the present invention, however. For example, according to certain aspects of the invention, the ring may alternatively be configured for clamping around the exterior of the tube.

In a preferred embodiment, the ring 42 includes first and second arms 56. The ring 42 is preferably generally toroidal, with the arms 56 each extending arcuately to form a portion of the toroid. The arms 56 are preferably identical to each other, although variations are permissible according to some aspects of the present invention. The arms 56 are connected to one another by a pivot pin 58 and a set screw 60 such that controlled (limited) pivoting of the arms 56 about the pivot pin 58 changes the shape and size (including the effective outer diameter) of the ring 42. Alternatively stated, the arms 56 are pivotable relative to one another.

More particularly, each arm 56 includes a bracket 62 and a boss 64. The bracket 62 of a first one of the arms 56 receives the boss 64 of the second one of the arms 56, and vice versa. The corresponding brackets 62 and bosses 64, upon appropriate alignment with one another, each cooperatively define an opening 66 therethrough for receiving either the pivot pin 58 or the set screw 60.

In the illustrated embodiment, the arms 56 cooperatively define an arcuately extending, radially outer mating surface 68. The mating surface 68 engages the apparatus body 14 and, more specifically, the inner wall 52 of the bearing cap 24 thereof, when the mounting frame 42 is in the installed configuration. As a result of such engagement, the expansion ring 42 is fixed relative to the bearing cap 24 and the apparatus body 14 in general when the expansion ring 42 is in the installed or expanded configuration. In contrast, the mating surface 68 is preferably at least part spaced radially inwardly from the apparatus body 14 at the inner wall 52 when the mounting frame or ring 42 is in the uninstalled configuration. The expansion ring 42 is thus axially shiftable relative to the bearing cap 24.

It is particularly noted that, in a sufficiently contracted configuration, shifting of the expansion ring 42 out of the bearing cap 24 is preferably achievable without dragging or other potentially damaging contact occurring between the expansion ring 42 and the bearing cap 24.

In a preferred embodiment of the present invention, the mounting frame 42 includes a plurality of pairs of axially spaced apart inner and outer retaining walls 70*a* and 70*b* each defining an axially adjacent and arcuately extending tab slot 72 therebetween.

The tab slots 72 are preferably evenly arcuately spaced apart. Even more particularly, each arm 56 preferably defines a pair of the tab slots 72. However, irregular spacing and/or distribution relative to the arms each fall within the scope of some aspects of the present invention.

Furthermore, the slots might in some embodiments be formed only in part by the mounting frame, with another component (such as the apparatus body) cooperating therewith. Formation of some of all of the slots by the tether is also permissible according to some aspects of the present invention, as will be discussed in greater detail below.

In a preferred embodiment, an arcuately extending notch 74 is defined by the mounting frame 42 adjacent and interconnected with each tab slot 72. The notches 74 will be discussed in greater detail below, as well.

Figure 6:
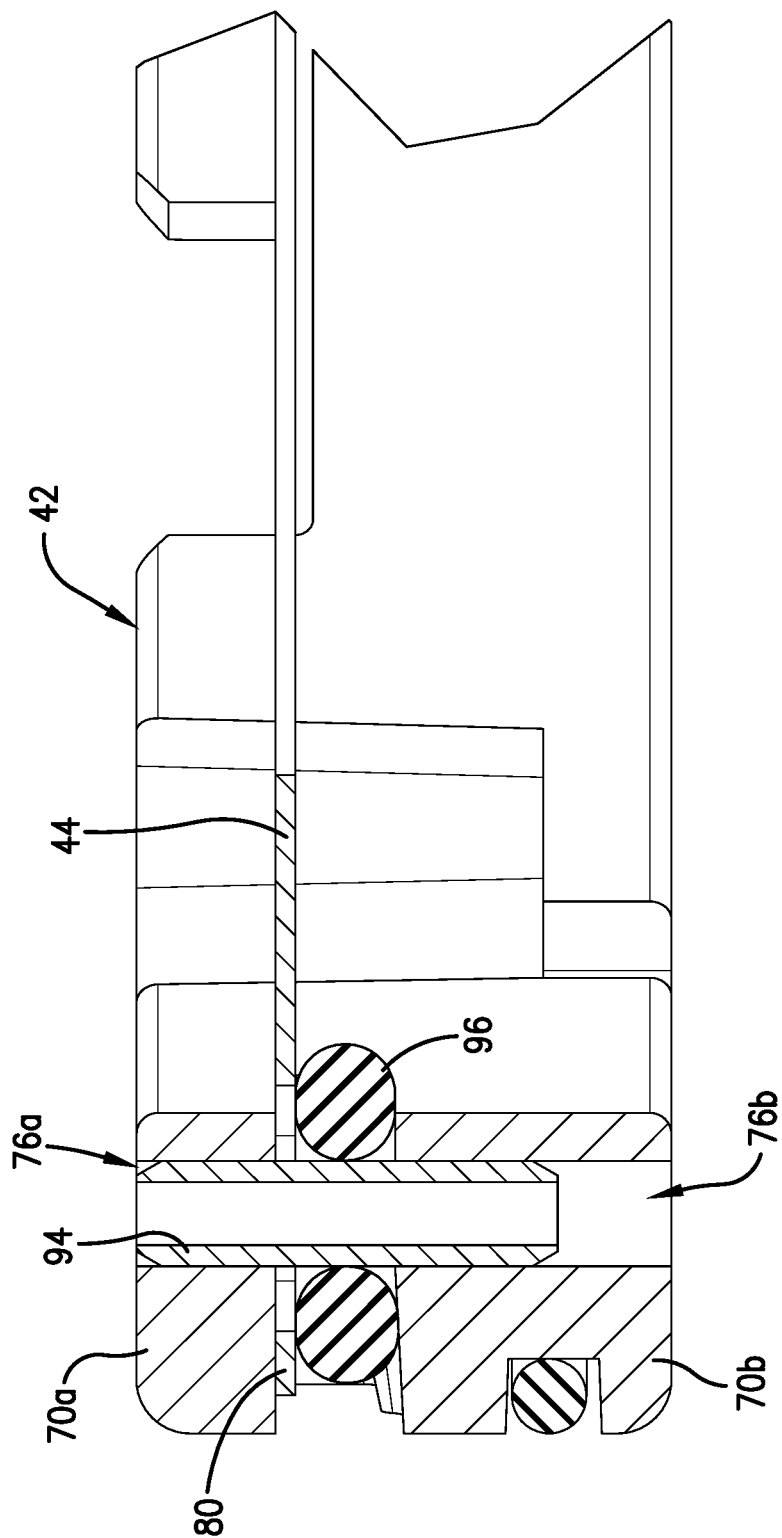
FIG. 6 is a cross-sectional side view, taken along line 6-6 of FIG. 5, of the mounting assembly of FIG. 5.
Figure 7:
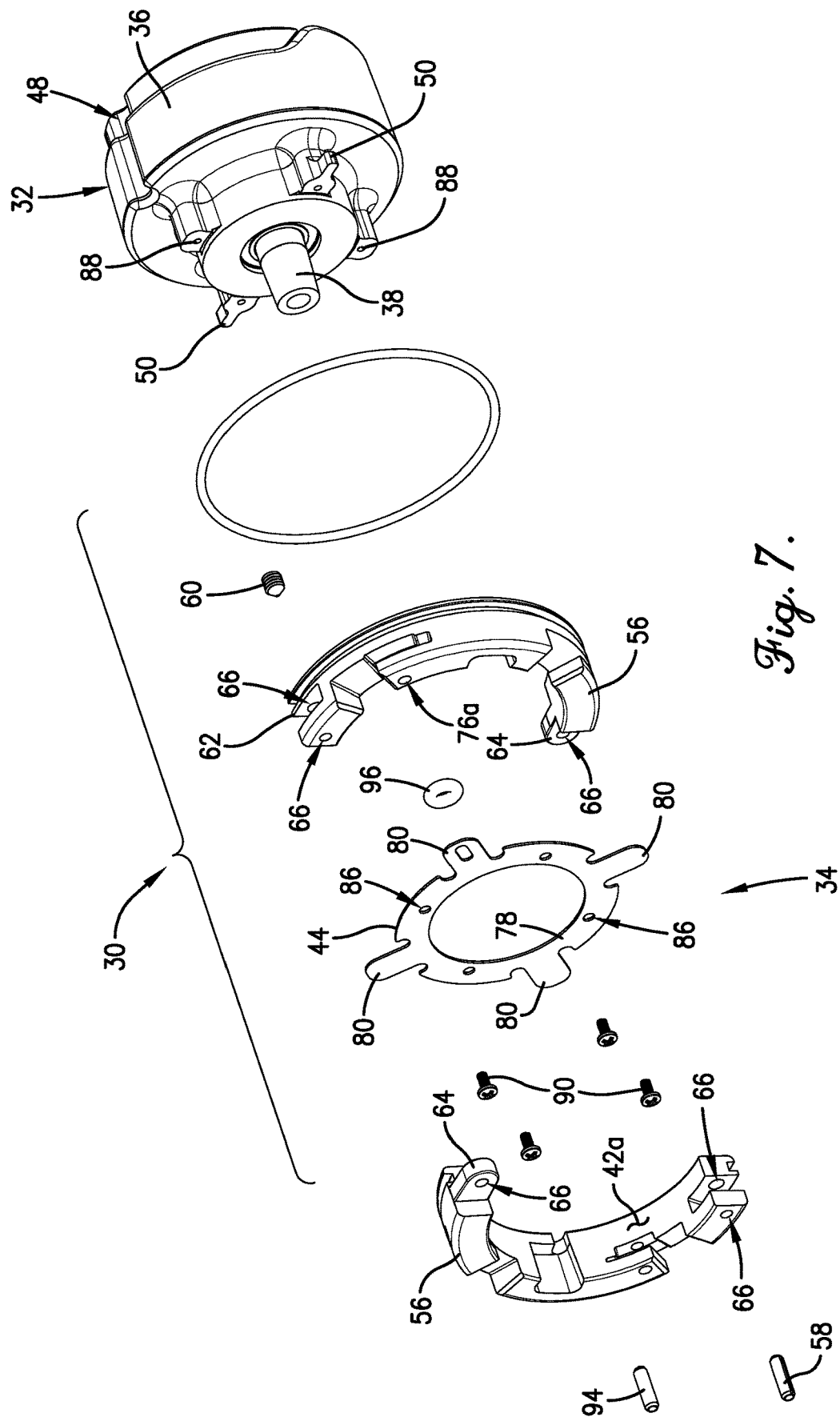
FIG. 7 is an exploded rear perspective view of the encoder assembly of FIGS. 1-4.

Still further, one corresponding pair of the retaining walls 70*a* and 70*b* of each of the arms 56 preferably cooperatively defines a tension pin aperture 76 therethrough. More particularly, as best shown in FIG. 6, each retaining wall 70*a* and 70*b* of the aperture-defining pairs defines a respective portion 76*a* or 76*b* of the corresponding tension pin aperture 76. The tension pin apertures 76 will also be discussed in greater detail below.

Tether

In a preferred embodiment, the tether 44 includes a generally toroidal or ring-like body or base plate 78 and a plurality of evenly arcuately spaced apart ears or tabs 80 extending radially outwardly from the base plate 78.

The tether 44 is preferably resiliently deformable in the axial direction, with such deformability being provided at least in part via deflection of the base plate 78. More particularly, the tether 44 is preferably in the form of a flexible plate.

In contrast, the tether 44 itself is preferably rigid in a tangential direction.

More particularly, the tether 44 preferably comprises spring steel or stainless steel having sufficient but not excessive flexibility to accommodate necessary amounts of axial displacement.

The tabs 80 are preferably sized, shaped, and positioned in coordination with the tab slots 72 described above. In the illustrated embodiment, for instance, four (4) tabs 80 are provided in an orthogonal arrangement relative to one another. More or fewer tabs and uneven spacing thereof fall within the scope of some aspects of the present invention, however, as does inward or otherwise alternate extension directionality, provided other coordinating elements are modified accordingly to maintain appropriate interactions and functionality.

A plurality of cutouts 82 are also preferably defined in the base plate 78 of the tether 44, with one (1) cutout 82 provided on each side of a given tab 80.

Varying the flexibility of the tether in keeping with desired performance may occur via, among other things, increasing or decreasing the number and/or dimensions of the cutouts, the axial thickness of the tether, and/or the number of tabs of the tether. Variations in how the tether is fastened to the encoder body, a preferred approach to which is described below, may also influence the flexibility of the tether.

In a preferred embodiment, one (1) of the tabs 80 defines a radially extending tension pin slot 84 therethrough. The function of the tension pin slot 84 will be discussed below.

The base plate 78 of the tether 44 defines a plurality of arcuately spaced apart fastener-receiving openings 86. The openings 86 correspond with openings 88 defined in the body 36 of the encoder 32. In the illustrated embodiment, for instance, four (4) openings 86 and four (4) openings 88 are provided in corresponding evenly arcuately spaced (that is, orthogonal) arrangements.

The encoder body 36 is preferably fixed directly to the base plate 78 of the tether 44 via fasteners 90 extending through the openings 86 and into the openings 88. Other fixation means fall within the scope of the present invention, however.

Encoder Assembly—Construction

In a preferred method of construction of the encoder assembly 30, the pivot pin 58 and the set screw 60 are inserted into corresponding ones of the openings 66 in the arms 56 to pivotably secure the arms 56 to one another and cooperatively form the mounting frame or expansion ring 42 of the mounting system 34.

Figure 8:
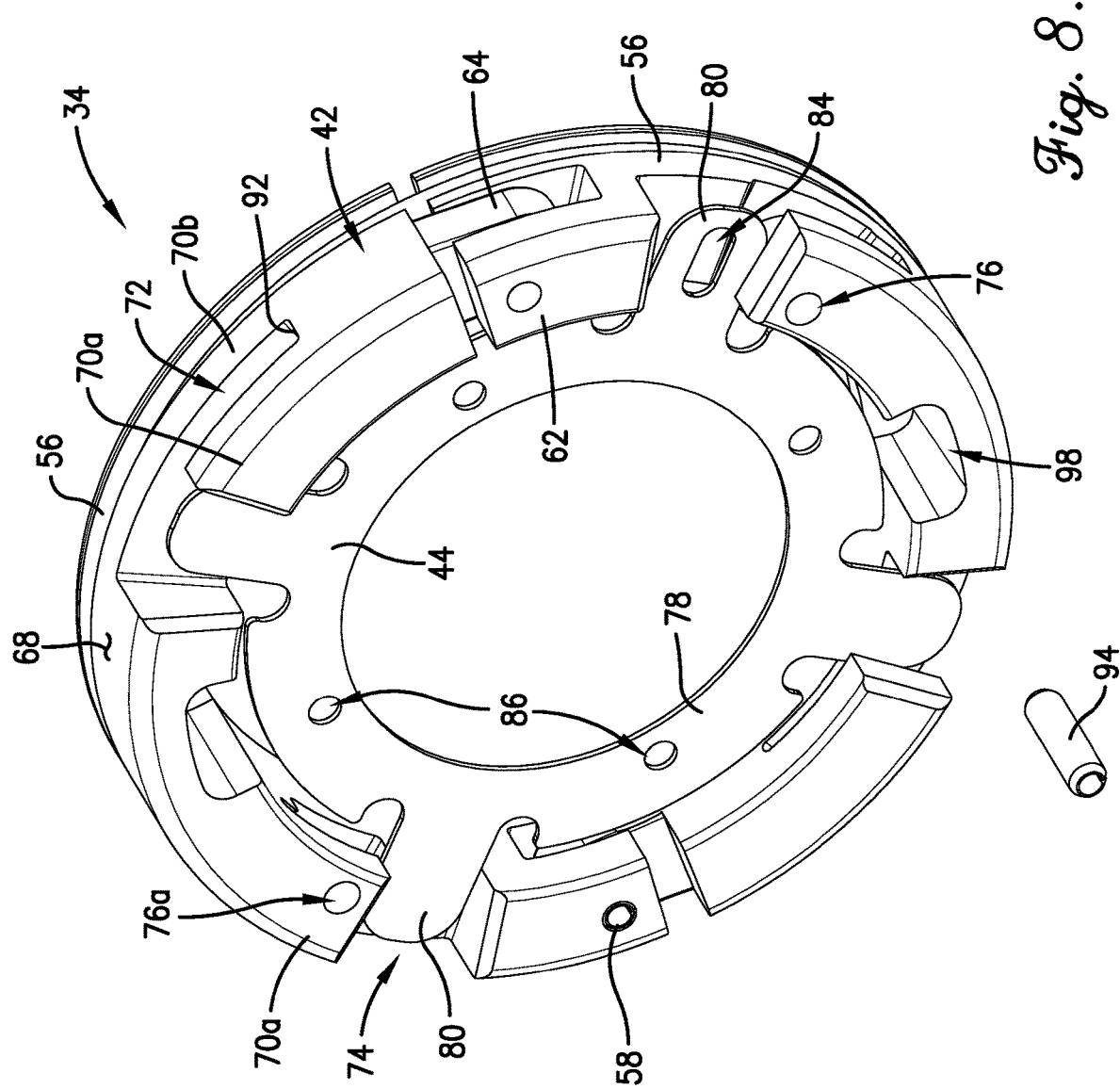
FIG. 8 is a partially exploded rear perspective view of the mounting assembly of FIGS. 5 and 6, prior to rotation of the tether and installation of the tension pin.

As shown in FIG. 8, the tether 44 is then inserted axially into the expansion ring 42, with the tabs 80 being received initially received in corresponding ones of the notches 74 and with the base plate 78 of the tether 44 being circumscribed by the ring 42.

Figure 9:
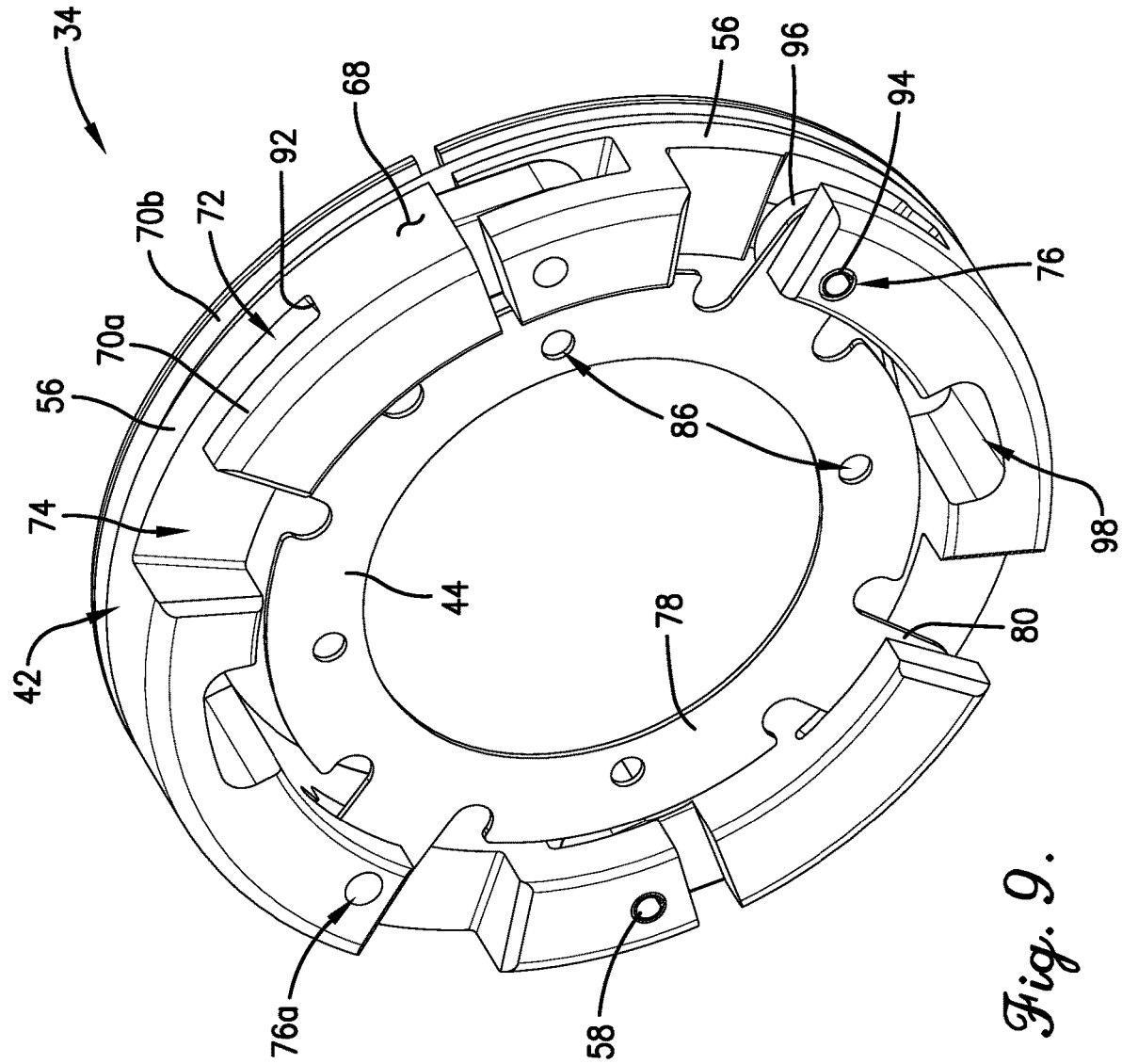
FIG. 9 is a rear perspective view of the mounting assembly similar to that of FIG. 8, but after rotation of the tether and installation of the tension pin.
Figure 10:
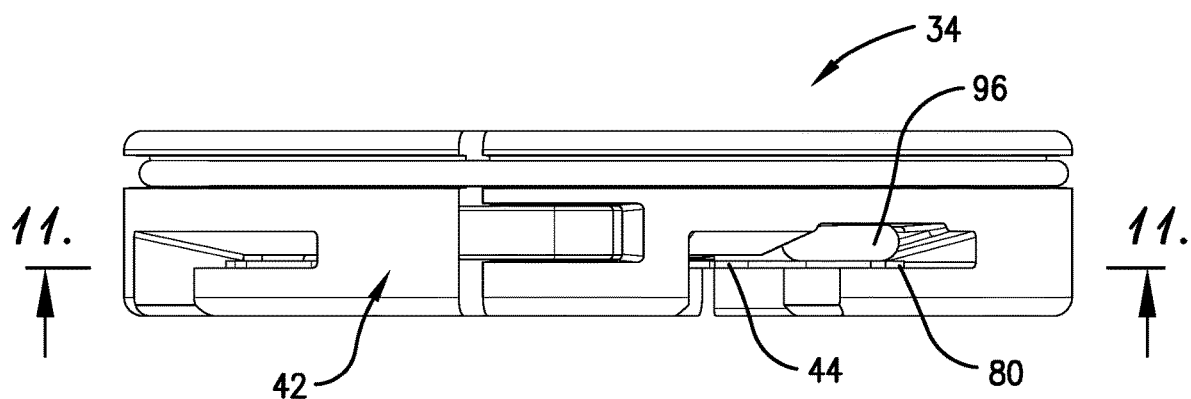
FIG. 10 is a side view of the mounting assembly in the configuration of FIG. 9, illustrating positioning of the filler adjacent a tab of the tether.

As shown in FIG. 9, the tether 44 is then rotated clockwise relative to the ring 42 such that the tabs 80 at least in part and most preferably in their entirety or nearly so slide into corresponding ones of the undercut tab slots 72 disposed adjacent and in communication with the notches 74. The tabs 80 are thus at least in part and most preferably in their entirety or nearly so disposed axially between corresponding ones of the retaining walls 70a and 70b and are limited in axial movement thereby.

Furthermore, the tabs 80 are limited in rotational movement by end walls 92 extending between and interconnecting corresponding pairs of the retaining walls 70a and 70b and, in turn, in part defining the respective tab slots 72.

Radial shifting of the tether 44 is limited by potential contact between the base plate 78 thereof and the mounting frame 42 itself, which circumscribes the base plate 78.

Furthermore, initial orientation of the tether 44 relative to the ring 42 before insertion thereinto is preferably such that, upon rotation of the tether 44 relative to the ring 42, the tension pin slot 84 defined in one of the tabs 80 aligns with one of the tension pin apertures 76 defined by the mounting frame 42.

As shown in FIG. 9 and others, the mounting system 34 further includes a tension pin 94. The tension pin 94 may be inserted through the inner portion 76a of the aligned tension pin aperture 76, thereafter into and through the tension pin slot 84, and further into the outer portion 76a of the tension pin aperture 76, preferably until an inner end of the tension pin 94 is flush with an inner surface 42a of the expansion ring 42. The tether 44 and the mounting frame 42 are thereby secured relative to one another but with limited relative movement permitted in part due to radial shiftability of the tension pin 94 within the tension pin slot 84. That is, the mounting frame 42 and the tether 44 are radially shiftable relative to each other in correspondence with shifting of the tension pin 94 within the tension pin slot 84.

In a preferred embodiment, a filler 96 (see, for instance, FIGS. 5, 6, and 10) is disposed within the tab slot 72 associated with the tension pin 94. More particularly, the filler 96 is disposed axially adjacent the tab 80 that defines the tension pin slot 84. The filler 96 axially fills any space in the tab slot 72 and biases the tab 80 against one of the retaining walls 70a and 70b (in the illustrated embodiment, the inner retaining wall 70a) to ensure there is zero or negligible backlash.

As will be readily understood by those of ordinary skill in the art, even a small amount of torque or bearing backlash could introduce positioning errors with the encoder measurements. As will also be understood by those of ordinary skill in the art, the friction associated with the filler 96 only needs to resist the force required to counteract the very low startup torque of the encoder bearings 40.

The filler 96 is preferably resiliently deformable and in the illustrated embodiment is in the form of an O-ring. Other configurations fall within the scope of some aspects of the present invention, however.

Although only a single filler 96 is provided in a preferred embodiment of the present invention, more fillers may alternatively be included. The filler may also be omitted without departing from the scope of some aspects of the present invention.

In addition to the above interactions, the projections 50 extending from the encoder body 36 are preferably received in corresponding recesses 98 defined by the arms 56 of the mounting ring 42. The projections 50 are a protective feature configured to prevent overtravel of the tether 44 if the arms 56 were to become stuck in the tube 26 of the bearing cap 24. That is, the projections 50 protect the tether 44 against potential permanent distortion should the above situation arise.

Once the tether 44 is retained within the expansion ring 42, the encoder 32 and the tether 44 are secured to one another by means of the screws or other fasteners 90 extending through the aforementioned openings 86 in the tether 44 and the openings 88 in the encoder body 36.

Encoder Assembly—Installation

The completed encoder assembly 30 may then be mounted to the electromagnetic apparatus 10. In a preferred methodology, the encoder assembly 30, with the expansion ring 42 in a contracted configuration, is first inserted into the opening 28 in the tube 26 of the bearing cap 24. As best shown in FIG. 3, the expansion ring 42 is positioned within the tube 26 so as to be circumscribed by the smaller-diameter inner portion 52a of the inner tube wall 52. The encoder shaft 38 is received in the receiver 46 of the rotor shaft 20.

The set screw 60 may then be accessed via the aforementioned channel 48 in the encoder body 36 to adjust the outer diameter of the expansion ring 42 (that is, to expand it to its installed configuration). The encoder assembly 30 is thus secured within the bearing cap 24 via engagement of the mating surface 68 with the inner wall 52 and interconnection of the encoder assembly 30 to the expansion ring 42 via the tether 44.

It is noted that, as clearly shown in FIG. 3, a substantial circumferentially extending gap 100 remains between the tube 26 and the encoder body 36. That is, direct contact between the encoder 32 and the bearing cap 24 is avoided.

Figure 11:
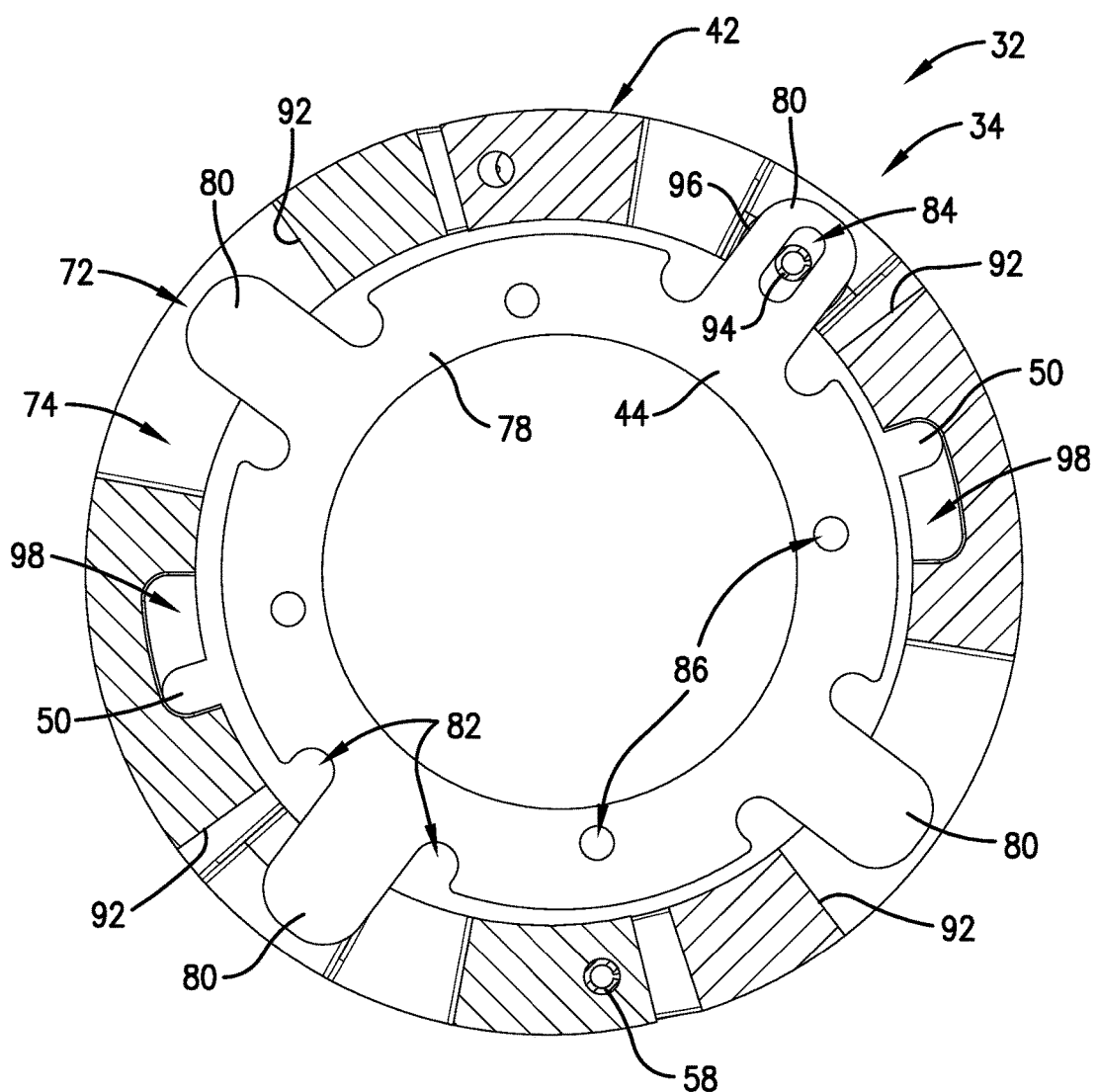
FIG. 11 is a cross-sectional rear view, taken along line 11-11 of FIG. 10, of the mounting assembly in the configuration of FIGS. 9 and 10.

With reference to FIG. 11 and others, it will be apparent that any motion from rotor shaft or encoder shaft runout will occur about the tension pin 94 within the tension pin slot 84 defined by the tether 44. As noted previously, displacement is additionally limited by the arms 56 (or, more broadly, the inner surface of the expansion ring 42), which restricts excessive radial movement of the base plate 78 of the tether 44 therein; by the end walls 92 that in part define the tab slots 72; and by axial obstruction caused by the retaining walls 70a and 70b relative to the tabs 80 and, in at least one instance, by the filler 96.

Encoder Assembly—Alternative Embodiments

Although the above-described configuration is preferred, it is particularly noted that it is permissible according to some aspects of the present invention for some of all of the tabs to instead be defined by the mounting frame, some of all of the tab slots to instead be defined by the tether, and so on. That is, an "inverted" or partially "inverted" configuration of the mounting assembly also falls within the scope of some aspects of the present invention.

Alternatively stated, it is permissible for either of the mounting frame and the tether to include one or more retaining walls at least in part defining one or more corresponding axially adjacent tab slots, with the other of the mounting frame and the tether defining one or more radially extending tabs each at least in part received in a corresponding one of the tab slots.

Furthermore, as noted previously, various mechanisms for expanding (or contracting) the mounting frame, including mechanisms which themselves extend outwardly (or inwardly) from fixed arms, fall within the scope of some aspects of the present invention.

Encoder Assembly—Selected Applications and Advantages

The present encoder assembly 30 may be used in a variety of applications and with a variety of electromagnetic apparatus types. For instance, in a preferred embodiment, the electromagnetic apparatus 10 is a motor 12 and, in particular, an elevator (up/down) motor 12. Alternate types of electromagnetic apparatuses, such as generators, could also be used with the encoder assembly. Still further, use with non-electromagnetic machines or components having a rotatable shaft is also permissible according to some aspects of the present invention.

More broadly, the encoder assembly 30 is compatible with any electromagnetic or non-electromagnetic apparatus, machine, component, or other mechanism including a tubular bearing cap or other tubular receiver. For instance, the encoder assembly might be configured for use with a sheave bearing assembly.

Apparatuses, machines, components, and mechanisms lacking a tubular bearing cap in their original design may also be easily made compatible through fitment with an appropriate tubular cap or receiver.

As will be apparent from the above structural description, the mounting system 34 functions as an auto-aligning system that prevents side loading of the encoder bearings 40 in the presence of shaft runout, while preventing rotation of the encoder body 36. This promotes axisymmetric bearing loads that substantially reduce lateral bearing forces. The absence of lateral bearing loads in turn promotes high quality encoder signals by reducing the amount of mechanical shaft-induced error. The absence of bearing side loading also allows for use of smaller bearings, thus facilitating a compact encoder design.

Stated differently, rigidity of the tether 44 in the tangential direction but flexibility in the axial direction advantageously prevents rotation yet allows shaft end play. That is, the inventive tether 44 allows more axial and radial movement than prior art systems while still restricting rotational movement. The tether 44 thus prevents unnecessary bearing wear due to either shaft runout/wobble or encoder runout/wobble and, as a result, enables selection of the smallest possible bearings. The tether 44 also allows the encoder 32 to move with the shaft, reducing initial and ongoing side loads to the encoder bearings and thus reducing wear (and facilitating use of the smallest possible bearings).

Importantly, the larger degree of shaft runout and end play described above is allowed without affecting the signal quality of the encoder output.

The encoder assembly 30 is also readily fitted into numerous existing motors without modification; and in instances in which modification is necessary, such modifications are relatively minor (such as provision of a tubular cap, as noted above).

Manufacturing is also simple, using only common techniques and a limited range of parts. For instance, the ring 42 is designed in an economical manner, with the two (2) arms 56 thereof being identical to one another.

Because the encoder assembly 30 is self-aligning, centering fixtures and/or indication measurements may be omitted, reducing tool requirements for installation. Installation is intuitive, and high levels of skill and precision are unnecessary due at least in part to the previously described large radial and axial compliance.

Still further, the ring 42 has a large range of motion via its broad expansion and contraction capability, facilitating ease of insertion or removal of the mounting system 34 into or out of the receiving element 24 (in the illustrated embodiment, the bearing cap 24 and in particular the tube 26 thereof). That is, the ring 42 may be substantially contracted to create clearance between the ring 42 and the tube 26 during installation or removal. Such capability not only enables use of the same mounting system 34 in a broad range of bearing caps having differing internal tube diameters, but also reduces or even eliminates encoder drag against the walls of the receiving tube 26. Such "dragging" problems are common in prior art configurations such as the wedge and ring system described above.

It is also particularly noted that the mounting system 34 may be used regardless of the functional or internal details of the given encoder. That is, the present invention is applicable regardless of whether the encoder 32 is optical or magnetic, absolute or incremental, and so on.

As will be readily apparent to those of ordinary skill in the art, the above advantages also in a general sense translate to improved encoder lifespan.

Finally, it is noted that the improved signal quality from the encoder enables better motor control. In an elevator motor, for instance, such signal quality facilitates reduced shudder, unnecessary acceleration/deceleration, and other variations to smooth operation that might be found disturbing by passengers.

CONCLUSION

Features of one or more embodiments described above may be used in various combinations with each other and/or may be used independently of one another. For instance, although a single disclosed embodiment may include a preferred combination of features, it is within the scope of certain aspects of the present invention for the embodiment to include only one or less than all of the disclosed features, unless the specification expressly states otherwise or as might be understood by one of ordinary skill in the art.

Therefore, embodiments of the present invention are not necessarily limited to the combination(s) of features described above.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

Although the above description presents features of preferred embodiments of the present invention, other preferred embodiments may also be created in keeping with the principles of the invention. Furthermore, as noted previously, these other preferred embodiments may in some instances be realized through a combination of features compatible for use together despite having been presented independently as part of separate embodiments in the above description.

What is claimed is:

1. An encoder assembly for an electromagnetic apparatus including an apparatus body and a rotor, wherein the rotor includes a shaft rotatable relative to the apparatus body, said encoder assembly comprising:
    an encoder including an encoder body and an encoder shaft,
    said encoder shaft configured to be coupled with the rotor shaft and rotatable relative to the encoder body about an axis; and
    a mounting system for mounting the encoder to the apparatus body,
    said mounting system including a mounting frame fixed relative to the apparatus body and a tether interconnecting the encoder body and the mounting frame,
    said mounting system permitting limited radial and axial movement of the encoder body relative to the mounting frame.

2. The encoder assembly of claim 1,
    said tether being resiliently deformable in the axial direction.

3. The encoder assembly of claim 2,
    said tether comprising a flexible plate.

4. The encoder assembly of claim 1,
    said tether being rigid in a tangential direction.

5. The encoder assembly of claim 1,
    said mounting system configured to automatically center the encoder and the rotor shaft relative to one another.

6. The encoder assembly of claim 1,
    said encoder body being fixed directly to the tether.

7. The encoder assembly of claim 1,
    one of said mounting frame and said tether including a retaining wall at least in part defining an axially adjacent tab slot,
    the other of said mounting frame and said tether defining a radially extending tab at least in part received in the tab slot.

8. The encoder assembly of claim 7,
    said one of said mounting frame and said tether including a pair of the retaining walls,
    said retaining walls cooperatively defining the tab slot therebetween,
    said tab being at least in part disposed axially between the retaining walls.

9. The encoder assembly of claim 8,
    said mounting system further including a resiliently deformable filler disposed in the tab slot and axially adjacent the tab,
    said filler biasing the tab against one of the retaining walls.

10. The encoder assembly of claim 7,
    said mounting frame including the retaining wall and at least in part defining the tab slot,
    said tether defining the tab.

11. The encoder assembly of claim 10,
    said tether including a base plate fixed to the encoder body,
    said tab extending radially outwardly from the base plate.

12. The encoder assembly of claim 7,
    said mounting frame and said tether cooperatively including a plurality of said tabs and defining a plurality of said tab slots.

13. The encoder assembly of claim 7,
    said mounting system further including a pin,
    said one of said mounting frame and said tether defining an aperture,
    said tab defining a radially extending pin slot therethrough,
    said pin extending through said aperture and into said pin slot to secure the tether and the mounting frame relative to one another,
    said pin being radially shiftable within said pin slot, such that the tether and the mounting frame are radially shiftable relative to each other.

14. The encoder assembly of claim 1,
    said mounting frame comprising an expansion ring shiftable between an installed configuration and an uninstalled configuration,
    said expansion ring including a mating surface configured to engage the apparatus body when the mounting frame is in the installed configuration, such that the expansion ring is axially fixed relative to the apparatus body, and be at least in part spaced from the apparatus body when the mounting frame is in the uninstalled configuration, such that the expansion ring is axially shiftable relative to the apparatus body.

15. The encoder assembly of claim 14,
    said expansion ring comprising first and second arms pivotable relative to one another.

16. The encoder assembly of claim 14,
    said mating surface extending arcuately.

17. The encoder assembly of claim 1,
    said encoder further including a projection extending radially outwardly from the encoder body,
    said mounting system defining a recess for receiving said projection.

* * * * *